United States Patent
Chou (10) Patent No.: US 11,252,103 B2
(45) Date of Patent: Feb. 15, 2022

(54) METHOD AND SYSTEM FOR SETUP OF NETWORK DEVICE

(71) Applicant: ZYXEL COMMUNICATIONS CORPORATION, New Taipei (TW)

(72) Inventor: Chih-Che Chou, Hsinchu County (TW)

(73) Assignee: ZYXEL COMMUNICATIONS CORPORATION, New Taipei (TW)

( * ) Notice: Subject to any disclaimer, the term of this patent is extended or adjusted under 35 U.S.C. 154(b) by 105 days.

(21) Appl. No.: 16/449,284

(22) Filed: Jun. 21, 2019

(65) Prior Publication Data

US 2020/0162403 A1    May 21, 2020

(30) Foreign Application Priority Data

Nov. 21, 2018  (CN) .......................... 201811392129.6

(51) Int. Cl.
*G06F 15/177* (2006.01)
*H04L 12/927* (2013.01)
*H04L 12/873* (2013.01)
*H04L 12/24* (2006.01)
*H04L 12/851* (2013.01)

(52) U.S. Cl.
CPC ........ *H04L 47/805* (2013.01); *H04L 41/0803* (2013.01); *H04L 41/20* (2013.01); *H04L 47/24* (2013.01); *H04L 47/52* (2013.01)

(58) Field of Classification Search
None
See application file for complete search history.

(56) References Cited

U.S. PATENT DOCUMENTS

| | | | |
|---|---|---|---|
| 7,886,031 B1* | 2/2011 | Taylor ................. | H04L 41/0873 709/220 |
| 8,194,555 B2* | 6/2012 | Morrill ............... | H04L 41/0896 370/230.1 |
| 8,527,622 B2* | 9/2013 | Moreira Sa de Souza ................. | H04L 41/0636 709/223 |
| 10,554,788 B2* | 2/2020 | Vlachogiannis ........ | H04L 67/34 |
| 10,560,348 B2* | 2/2020 | Stephenson ......... | H04L 41/0668 |
| 10,574,785 B2* | 2/2020 | Gat ........................ | H04L 67/32 |
| 2010/0138688 A1* | 6/2010 | Sykes ................... | H04L 41/147 714/4.1 |
| 2013/0103749 A1* | 4/2013 | Werth ................... | G06F 9/5072 709/203 |
| 2017/0325264 A1* | 11/2017 | Cherian ............ | H04W 74/0816 |

* cited by examiner

*Primary Examiner* — Phuoc H Nguyen
(74) *Attorney, Agent, or Firm* — Li & Cai Intellectual Property (USA) Office (57) ABSTRACT

A method for setup of a network device and a system thereof are provided. The method is operated in a gateway device in a LAN. In the method, a software sequence operated in the gateway device receives packets generated by a terminal device in the LAN. After analyzing the packets, a message for triggering a setting process is generated if an event in compliance with a trigger condition is determined from the packets. The message for triggering a setting process is transmitted to a default setup device. The setup device is such as a computer device that allows the user to set up parameters according to an event requirement. When the network device receives the parameters, a corresponding function in the network device is re-activated.

16 Claims, 5 Drawing Sheets

METHOD AND SYSTEM FOR SETUP OF NETWORK DEVICE

CROSS-REFERENCE TO RELATED PATENT APPLICATION

This application claims the benefit of priority to Patent Application No. 201811392129.6, filed on Nov. 21, 2018 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The disclosure relates to a method for setup of a network device, more particularly to a method for setup of the network device that is triggered by a network event and a system thereof.

BACKGROUND OF THE DISCLOSURE

A device in a communication network, such as a router or a switch typically provides many parameters for a variety of network functions. The parameters may be applied to a firewall, Quality of Service (QoS), and a policy of access control. These parameters often involve complicated professional knowledge and rely on the operations of experts. Therefore, for mass-production products, the parameters of the network equipment are initially with the factory default settings.

However, for the end user, the factory default setting may not be uniformly applicable to every terminal requirement, and thus needs for improving flexibility and customization are required. Further, the customized settings may not be applicable to a variety of situations, and there may be a need to change settings timely at any time.

For example, when someone is making a voice call while another person is watching network video and still another person is playing the online game in the same LAN, under the service quality setting, the voice call acts as a first priority service and the network bandwidth for the voice call should be guaranteed under a QoS control. The online game has a secondary priority and requires a certain amount of network bandwidth. In general, the network bandwidth for the online media may not be guaranteed. However, the conventional network device is unable to provide an immediate and efficient setting method if there is an immediate bandwidth requirement for the online media.

SUMMARY OF THE DISCLOSURE

In response to the above-referenced technical inadequacies, the present disclosure provides a method and a system for setup of a network device.

The disclosure relates to a method for setup of a network device, and a system thereof. In particular, the method is provided for triggering a customized setting when a specific network event occurs.

According to one embodiment, a method for configuring the setting parameters in a network device is introduced. When the network device receives the packets generated by a terminal device in a LAN, the packets are analyzed and a software sequence running in the network device determines if the setting parameters needs to be configured according to an analysis result. If the packets analysis result shows that an event matches a trigger condition, a message for triggering a setting process is generated. The message is then transmitted to a setup device, and the setup device generates the setting parameters.

In one embodiment of the disclosure, the setup device can be a user-end computing device or any terminal device binding with the network device. Binding a computing device or any terminal device with the network device allows a user of the computing device or the terminal device to provide the setting parameters to the network device. When the network device receives the setting parameters, the corresponding function in the network device is re-configured.

The setting parameters for instance are QoS parameters or access control parameters. A trigger condition for triggering the setting process can be an application condition set in the network device, for example, when an application such as watching movie, voice communication, or inappropriate content is detected, the setting process is triggered; the trigger condition can be a time condition, for example, triggering the setting when a time threshold is reached; and the trigger condition also can be a terminal device identification condition, for example, when a terminal device from a specific IP or MAC is detected, the setting process is triggered. According to the above mentioned events, a message for triggering a setting is generated. Further, the setting parameters provided by the present disclosure are stored in the network device or a cloud server. After accumulating the setting parameters for a period of time, the customized setting parameters for the network device are generated.

According to an embodiment of the system for setup of the network device, the network device can be a gateway device of a LAN. The gateway device is used to connect with one or more terminal devices. The network device includes a processor and a memory. The processor performs the method for setting the network device. The method is to receive the packet generated by each terminal device of the LAN, and then determine whether to generate a message for triggering a setting process according to the packets analysis result. When the message for triggering a setting process is transmitted to the setup device, the corresponding function of the network device is re-configured according to the received setting parameters.

Furthermore, the system further includes a cloud server that includes a database. The cloud server receives the setting parameters transmitted from the network device and generates a variety of customized setting parameters that correspond to various requirements.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, messages or the like, which are for distinguishing one component/message from another one only, and are not intended to, nor should be construed to impose any substantive limitations on the components, messages or the like.

The disclosure is related to a method and a system for setup of a network device. The system can be a Local Area Network (LAN) or a network system of a specific area. A network device such as a gateway is located in the LAN. The method can be a software-implemented method that is operated in the network device to trigger a process for setting the network device according to a network event.

Under a circumstance such as a home network system, the parents have authority to set up a bandwidth and a time limit of network for their children. A computer device used by the parent is connected to a gateway, and the gateway sets the relevant setting parameters used by the home network. For example, the setting parameters can be a quality of service (QoS) parameter, an access control parameter or the like. The setting parameters can be related to the parameters of a firewall function in the gateway of the system. Hardware vendors of network devices adopt this mechanism so as to provide parents with restrictions on their children's usage of the network in a variety of situations. If the method is applied to an enterprise network, an authorized network administrator can flexibly set the gateway parameters according to the usage requirements and conditions. For example, the setting parameters for the network are altered based on every user's class, department, time of use, or different network applications. The setting parameters are parameters for QoS or access control.

In an exemplary example, the system for setup of the network device is able to provide the setting parameters in advance for events that are expected to happen. For example, if a child has an exam next week, parents can pre-configure the QoS parameter as well as the access control parameter adopted by the gateway during this week. These temporary parameters can be set to restore the original settings or be set to make further changes after the event ends. A trigger condition can be an application condition that can trigger a setting process in the network device. That is, when the software process running in the gateway detects that the child (or employee) is using a large packet flow such as watching a movie, performs voice communication, or even viewing inappropriate content. A message for triggering a setting process will be generated. After that, the parents or a supervisor of the employee can be notified by the setup device and allowed to instantly adjust a network bandwidth. In an aspect, the trigger condition can be a time condition, for example, setting up a time limit for the children or the employee to use the network. If the time condition meets, the setting process is triggered so that the parents or the supervisor can set up the parameters for limiting network usage time, bandwidth, or the priority of usage. Further, the setting of the service quality and the access control in the gateway may be changed according to the setting of the calendar. The other trigger condition is, for example, identifying the IP address (Network address) or MAC (Media Access Control) address of the terminal device. Further, the trigger condition may adopt setting the IP address or MAC (Media Access Control) as the trigger condition that is used to identify a terminal device. The setting parameter may be determined according to a terminal device identification condition. The setting parameters of the above network device may be operated according to a specified rule, or may be changed in real time due to a specific event being triggered. For example, when traffics from a specific IP or MAC of a terminal device are detected by the gateway, the software process running in the gateway can determine that the traffic source is from a parent (or business executive) or a child (or employee), or a specific person, and that the setting parameters in the gateway can be configured depending on the traffic source. Accordingly, the setting parameters change due to the various sources of the packets. The setting parameters of the above network device may be operated according to a specified rule, or may be changed due to a specific event being triggered.

For the process for setting up customized setting parameters, different QoS parameters and access control parameters can be used in different situations. In an exemplary example, in general, the system allows an enterprise's administrator to set up various QoS parameters and access control parameters for different departments and employees. When the network device detects that someone has a voice call or video call to an important customer, the guaranteed bandwidth can be set for the application through a setting interface generated, and the priority to use bandwidth is guaranteed In the process for setting up QoS, a bandwidth setting is made for setting up bandwidths for different users with specific requirements. In the process, a priority is provided for different users to use high to low bandwidths. The priority can also be different within different periods of time. Any user who is authorized to set up QoS also has permission to set up the bandwidth. For setting up the access control parameters, the related parameters are configured to limit the bandwidth applicable for a specific source, a period of time or an application. Further, the system can also allow the authorized user to deny any user using the network.

Figure 1:
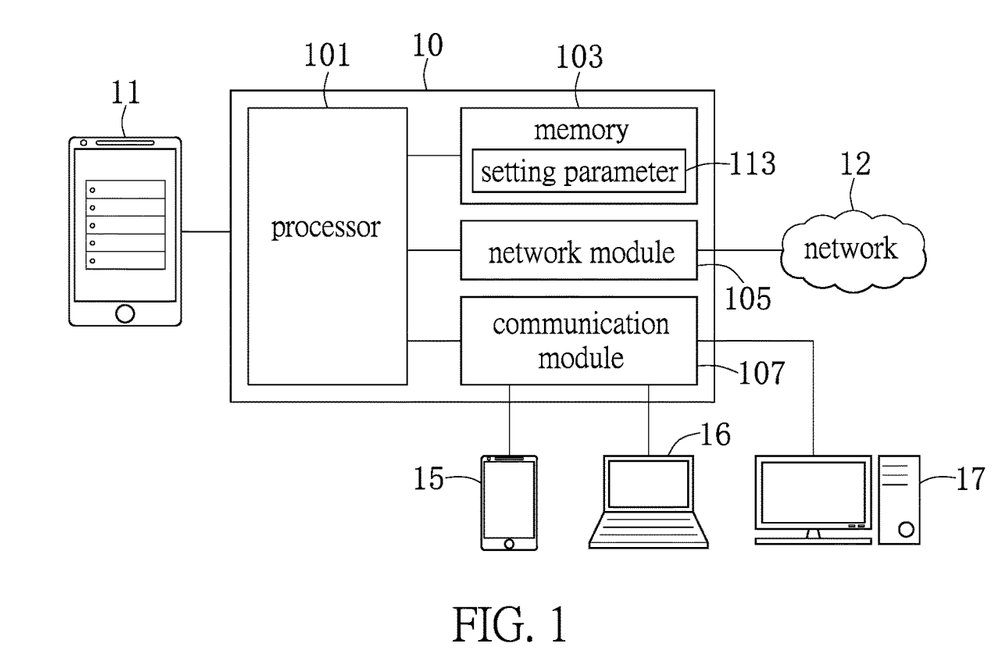
FIG. 1 shows a schematic diagram depicting a system for setup of network device in one embodiment of the disclosure.

FIG. 1 shows a schematic diagram depicting a system for setup of a network device in one embodiment of the disclosure.

In the schematic diagram of the system, a network device 10 shown in the diagram includes several main circuits such as a processor 101 for operating the network device 10, a memory 103, and some other circuit components electrically connected with the processor 101. Further, a network module 105 for serving the network device 10 is used to connect with a network 12, e.g., Internet, and a communication module 107 for internal network connection are provided. The internal network connection can be implemented by a wired connection or via a wireless network. The present example shows that one or more terminal devices 15, 16 and 17 constitute a LAN via the network device 10. The network device 10 allows the terminal devices 15, 16 and 17 to connect with the network 12. The memory 103 of the network device 10 stores an operating system and the related programs for operating the network device 10. The memory 103 also stores setting parameters 113 for the network device 10.

In the system for setup of the network device, a setup device 11 is provided for binding the network device 10. The setup device 11 can also be one of the terminal devices 15, 16 and 17 in the LAN. The network device 10 is configured to designate the setup device 11 to be a default device for triggering a setting process. The setup device 11 can be a mobile device, e.g. a cellular phone or a tablet computer.

In one further embodiment, the setup device 11 can be connected to the network device 10 outside the network of the area, that is, via the network 12. Therefore, the setup device 11 allows a user to set up the network device 10 anywhere in the external network.

For example, the processor 10 of the network device 10 performs an instruction set for setup of the network device 10 stored in the memory 103. A software process operating in the network device 10 analyzes packets when it receives the packets from the terminal devices 15, 16 and 17. If a trigger condition is matched according to an analysis result, a message for triggering a setting process is generated and transmitted to the setup device 11 via the LAN. In an exemplary example, if the setup device 11 is located outside the LAN, for example at an external network, the message for triggering a setting process is transmitted to the setup device 11 via the external network, e.g. Internet or mobile communication network, according to a network setting corresponding to the setup device 11. The network device 10 can transmit message according to a MAC address, or via VPN (private proprietary network) if the setup device 11 is outside the LAN.

Figure 2:
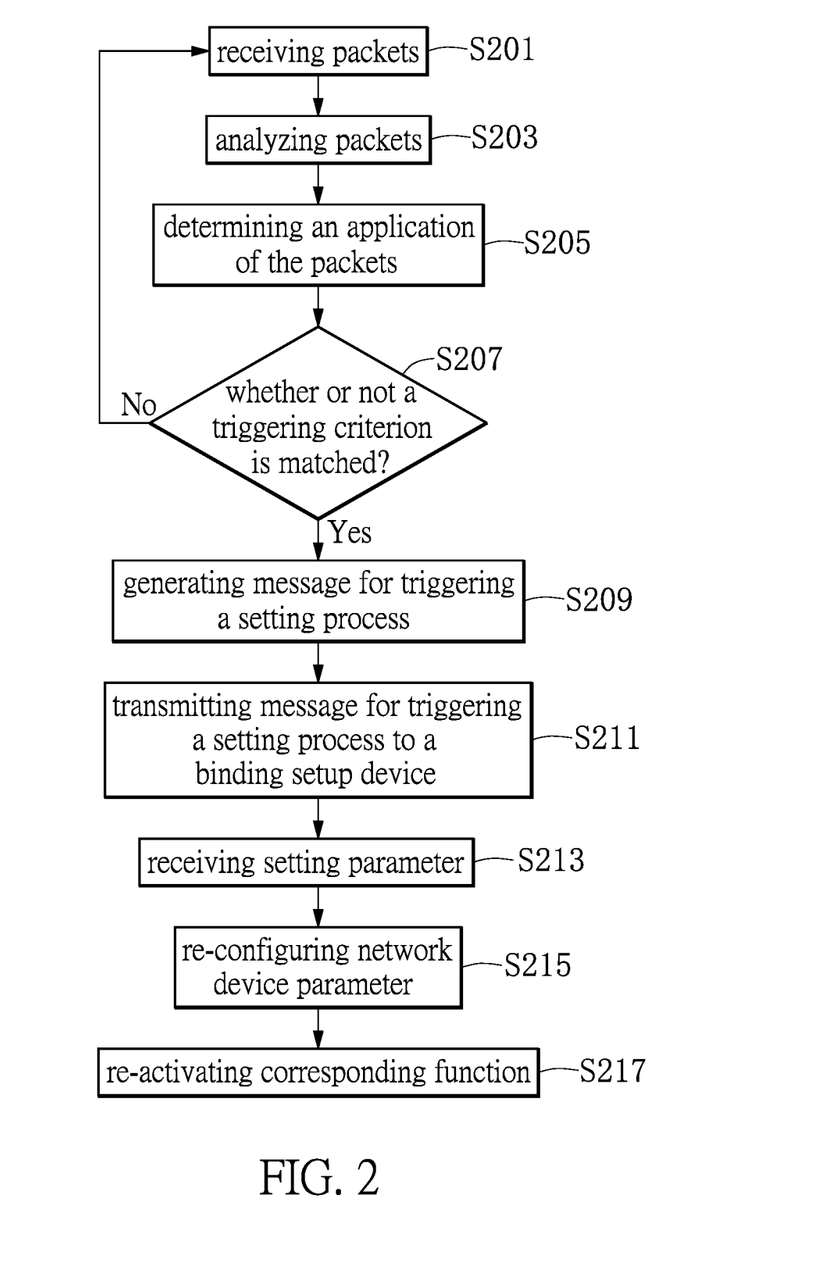
FIG. 2 shows a flow chart describing a method for setup of network device according to one embodiment of the disclosure.
Figure 3:
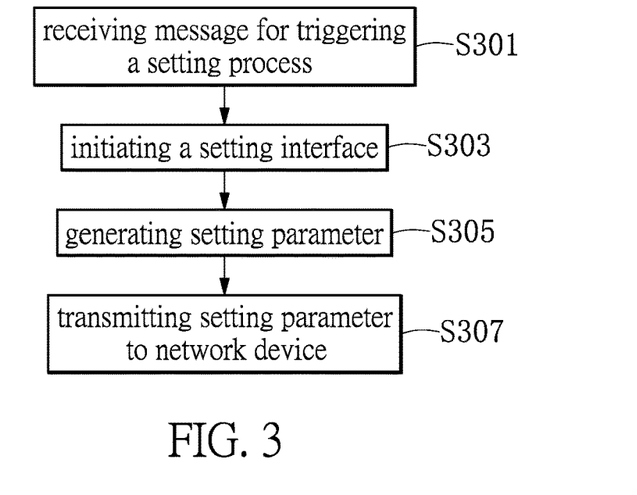
FIG. 3 shows a flow chart describing a process operated in a setup device in the method for setting up network device according to one embodiment of the disclosure.

Reference is next made to FIG. 2 that shows a flow chart describing the method for setup of network device in one embodiment of the disclosure. Referring to FIG. 3, another flow chart for describing process of setting up parameters in the setup device is shown.

The aspect of the present disclosure may include a method for setup of network device which is implemented by a software program executed in the network device. The software process becomes a daemon process when a processor of the network device performs the program. In the beginning of the process, as in step S201, the network device receives packets generated by various terminal devices. In step S203, the software process running in the network device analyzes the packets so as to resolve a source, a destination and content of the packets.

In one embodiment, in addition to calculating data flow of the packets and determining if there is abnormal traffic, therefore the source and destination of the packets can be obtained by analyzing the packet header. Further, a communication port, a communication protocol and timestamp can also be obtained from the packet header. An application of the packets can also be obtained according to the above-mentioned information of the packets. In step S205, a QoS priority for the application can be determined accordingly, for example, by analyzing the packets some network applications may occupy the specific communication port numbers, those applications are in compliance with some video or image formats.

After that, a source of the packets can be obtained according to the analysis result. For example, a source IP or MAC address of the packets is used to identify the terminal device and the information extracted from the packets is used to determine a user, a destination, an application and a time stamp. In step S207, the software process running in the network device determines whether or not the packets analysis result matches the trigger condition. If the trigger condition is not matched, the process repeats the steps from step S201 until any event matching the trigger condition is determined.

If one event found matching the trigger condition, such as in step S209, the software process operated in the network device generates a message for triggering a setting process. In step S211, the message is then transmitted to a pre-configured setup device with a preset communication method. The setup device can be one of the terminal devices within a LAN that is the same with the network device. Alternatively, the network device may be one of the terminal devices in the LAN, or may be outside the LAN, so that the network device transmits the message for triggering a setting process to the setup device via a specific communication protocol.

Figure 7:
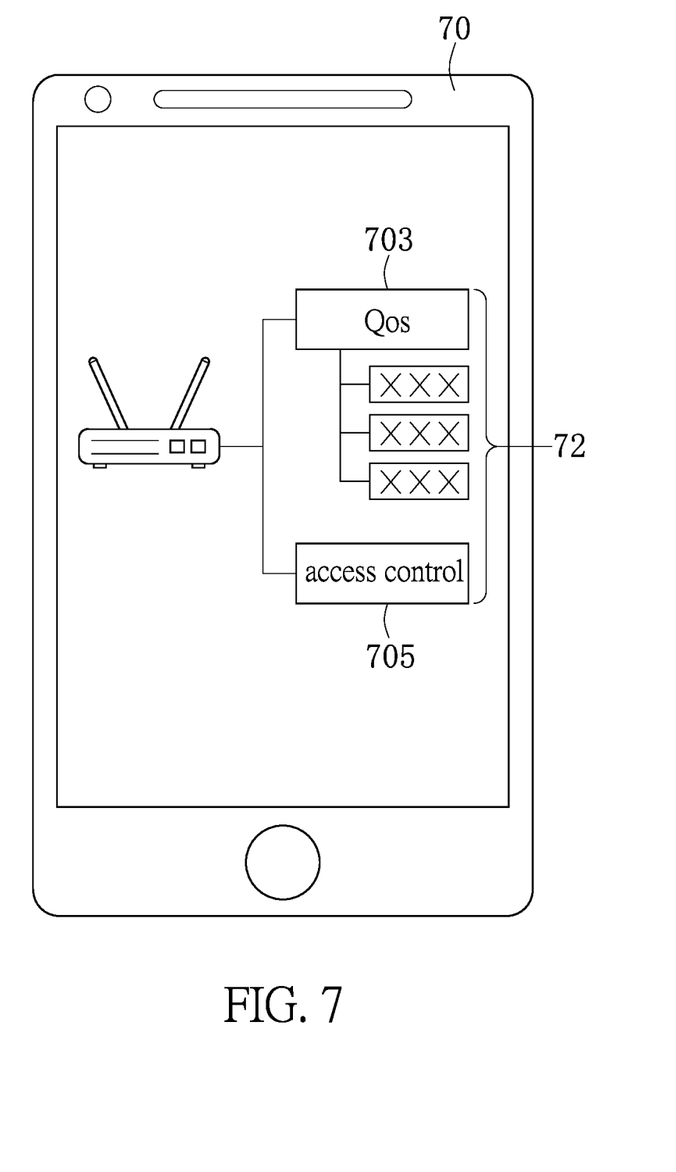
FIG. 7 shows a schematic diagram depicting a process of setting an interface using a setup device according to one embodiment of the disclosure.

Next, in the setup device, a process described in FIG. 3 is performed. In one embodiment of the disclosure, such as in a beginning step S301, a software process running in the setup device receives a message for triggering a setting process from the network device. In step S303, the setup device initiates a setting interface such as a graphical user interface (GUI) after meeting a trigger condition. The GUI refers to a setting picture exemplarily shown in a setup device 70 of FIG. 7. The user interface is provided for the user to set up QoS parameter or access control parameter for the terminal device. Referring to FIG. 7, the user interface is displayed, such as a menu 72 for setting up QoS option 703 or access control option 705 of FIG. 7. In step S305, a setting parameter is generated. The setting parameter is encrypted if necessary. In step S307, the setting parameter is transmitted to the network device.

Figure 4:
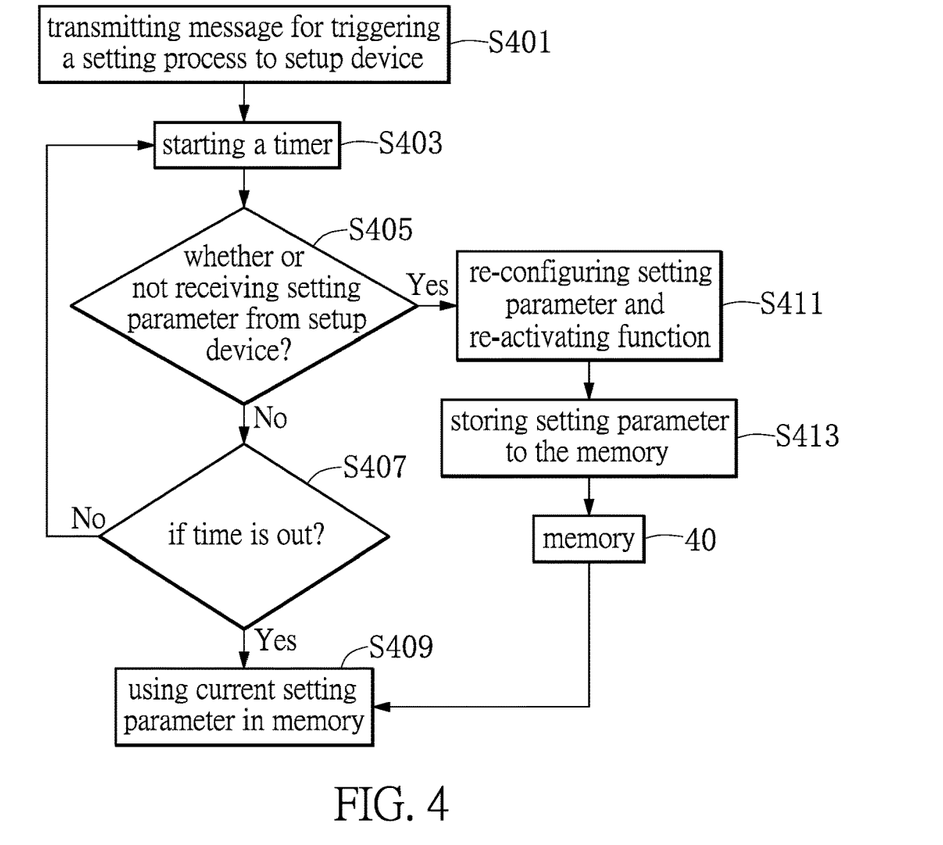
FIG. 4 shows a flow chart describing a process operated in a network device in the method for setting up network device according to one further embodiment of the disclosure.

Referring to step S213 of FIG. 2, the network device receives the setting parameter from the setup device via the LAN or an external network. Next, in step S215, the software process cooperated with a driver operated in the network device is used to re-configure or partially configure the parameters for the network device. When necessary, such as in step S217, a corresponding function can be re-activated or restricted by operating the system. The function corresponding to the event that triggers the setting process can takes effect with the updated setting parameter immediately. Reference is made to FIG. 4 showing a flow chart that describes a process in a network device for setting up the network device in one embodiment of the disclosure. The software process running in the network device can monitor whether or not any event in the LAN matches the trigger condition anytime. As described above, the packets generated from the network device can be used to determine whether or not any or a combination of events is found to match an application condition, a time condition or identification for terminal device. For example, the application condition may indicate an application such as seeing a movie, conducting a voice call or using improper content. The time condition indicates a time limitation that triggers the setting process when it is up. The identification for terminal device utilizes its IP address or MAC address. If there is an event matching one of the conditions, such as in step S401, a message for triggering a setting process is generated and transmitted to a setup device.

In the meantime, the software process running in the network device starts a timer (step S403), and constantly determines whether or not to receive the setting parameter sent from the setup device (step S405). If the setting parameter is received from the setup device within a period of time, as in step S411, full or part of the parameters in the network device will be reset. In addition, the parameter corresponding to a specific function of the network device can be updated by re-activating the network device. The updated setting parameter can be stored in a memory 40 of the network device (step S413).

In step S405, the process proceeds to determine whether the setting parameter sending from the setup device has not been received (step S407). The process goes to S403 if there is no timeout (step S403). If the timeout occurs, the network device continues to use the present setting parameter that is previously stored in the memory 40 (step S409).

It is worth noting that the setting parameter stored in the memory 40 of the network device can be a customized setting parameter after accumulating the related data for a period of time. A customized setting parameter with respect to the network device is generated by performing a data processing process. The customized setting parameter acts as a basis for automation of the setting parameter applied to the network device. When accumulating the data related to the setting parameter for a period of time, some characteristics of the network device within the LAN can be obtained. In an exemplary example, the characteristic of time for the network device is obtained, and the corresponding setting parameters can be automatically executed in daily, weekly, and monthly operations; Further, the characteristic of each user for the network device in the LAN is to apply a specific setting parameter to each of the terminal devices according to identification, including priority of bandwidth usage, access control, and the like. Furthermore, the software process operating in the network device is able to set up the parameters fitted the various applications within the LAN due to a learning process for a period of time.

In one application, after accumulating setting parameters for a period of time, the system can develop an overall network usage plan for the LAN. For individuals, a user profile can be created for a personal use in order to use the network resources more efficiently.

Figure 5:
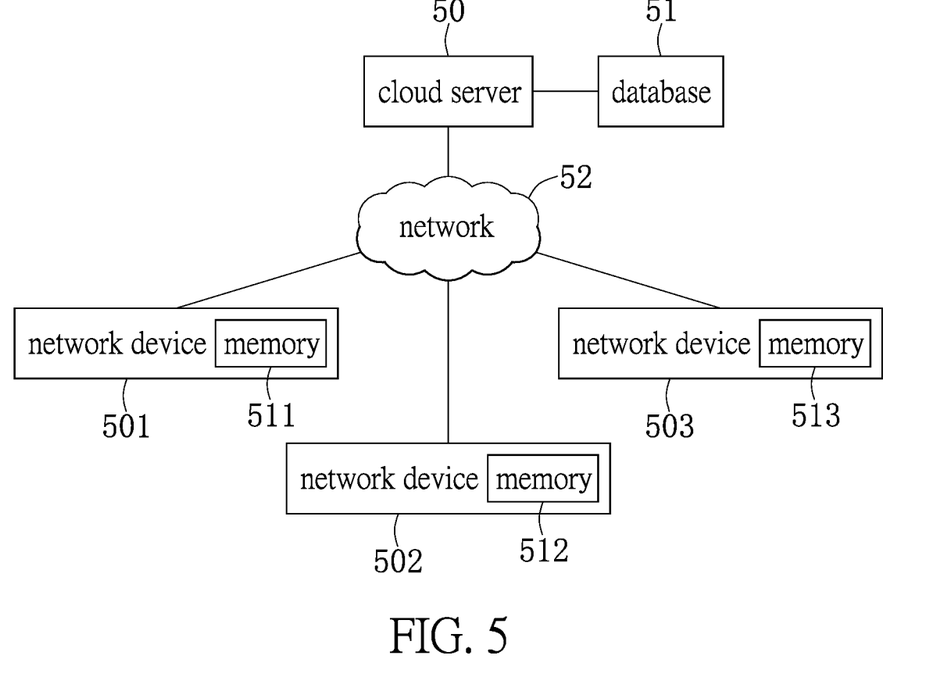
FIG. 5 shows a schematic diagram depicting the system for setting up network device in one further embodiment of the disclosure.

FIG. 5 shows a schematic diagram of a system framework of the system for setup of network device in one further embodiment of the disclosure. A cloud server 50 with a database 51 is further provided. The cloud server 50 connects with multiple network devices in multiple LANs via a network 52, e.g. Internet. For example, a network device 501 with a memory 511, a network device 502 with a memory 512 and a network device 503 with a memory 513 are schematically shown in the diagram. It should be noted that the number of the network devices shown in the diagram are not limited for the system but merely used to explain the system using the cloud server 5.

Each of the network devices 501, 502 and 503 constructs a respective LAN, and is connected with one or more terminal devices. Each of the network devices 501, 502 and 503 includes a processor (not shown in the diagram) and a memory such as the memory 511, 512 or 513. The processor is used to perform the method for setup of network device. In the method, any event that triggers the setting process can be determined by analyzing the packets generated by the terminal devices. A related setup device then generates a setting parameter and the setting parameter is then stored in the memory 511, 512 or 513.

Each network device can determine the setting parameter (generated by the setup device) according to a variety of situations of LAN, for example, a quality of service (QoS) parameter for each end network device (501, 502 and 503) is located. The setting parameter is especially made for setting QoS that refers to traffic prioritization for different terminal devices or bandwidth setting for different applications. The setting parameter is also made for access control that is used to limit usage and time of network for different terminal devices. In addition, the cloud server 50 is configured to collect the setting parameters from the network devices 501, 502 and 503. The database 51 of the cloud server 50 stores those setting parameters that form the customized setting parameters corresponding to various requirements.

Figure 6:
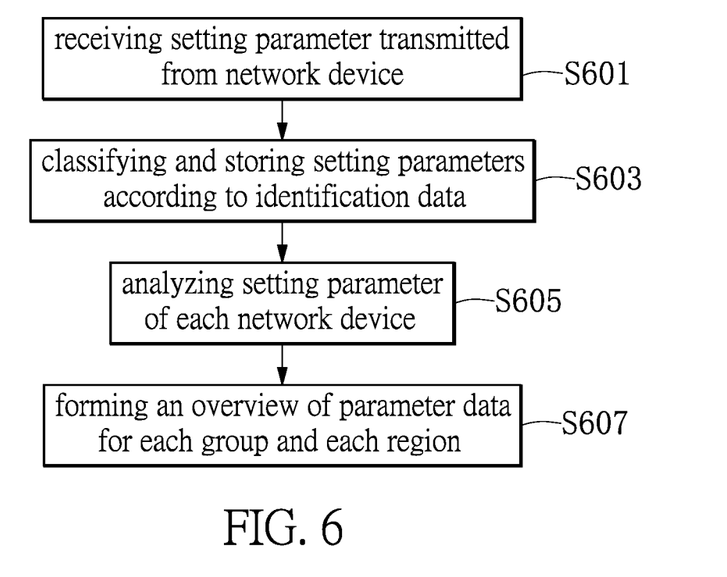
FIG. 6 shows a flow chart describing the method for setting up network device performed in the system in one embodiment of the disclosure.

In one further embodiment, reference is made to FIG. 6 showing a flow chart that describes the method for setup of network device. In step S601, the system collects the setting parameters from the network devices 501, 502 and 503 through the cloud server 50. In step S603, the cloud server 50 can classify and store the parameters based on their identification data. For the classification, the system assigns different identification data individually for different network devices. In step S605, a software process operating in the cloud server 50 analyzes the setting parameters collected from the network devices so as to create a big data. The big data allows the system to generate an overview of parameter data for each group and each region, such as in step S607.

Under the service rendered by the cloud server 50, a big-data analysis can be used to learn the network usage behaviors with respect to regions, countries or races when accumulating sufficient data such as the setting parameters. Accordingly, the cloud server 50 can render a customized setting parameter for the network devices sold to a specific region, country or race when learning the setting from the data collected by the cloud server 50. Therefore, the system can provide the setting parameters that meet the regional needs when the network devices are shipped from a manufacturing factory.

Therefore, the setting parameters that are collected by the cloud server 50 from the network devices located in various regions allow the system to learn the time characteristics for the network devices in different regions. The time characteristics allow the network device to perform a corresponding setting parameter assigned by the cloud server 50 in daily, weekly and monthly operations. For individuals, the setting parameters collected from the network devices in the database 51 allow the system to learn the behaviors of individuals in each LAN so as to create the user setting parameters.

In sum, according to the embodiments in accordance with the method and system for setup of network device described above, the method operated in the network device can provide customized setting parameters for the network device in real time. The setting parameter can be applied to set a guaranteed bandwidth or priority of use for each of the applications and users. The setting parameter can also be applied to access control for limiting the applications and time available to the users. Further, compared to the conventional technology, the method of the disclosure allows the user via a user interface to change the setting temporarily, or to perform setting if a specific event triggering the setting process occurs.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for setup of a network device in a LAN, operated in a network device, comprising:
    analyzing packets received from one or more terminal devices, wherein the one or more terminal devices are connected to Internet via the network device;
    generating a message for triggering a setting process if a trigger condition is matched according to an analysis result, wherein the trigger condition is one or any combination of an application condition, a time condition and an identification for the one or more terminal devices that are set in the network device;
    transmitting the message for triggering a setting process from the network device to a setup device, wherein the setup device is connected with the network device via the LAN or an external network and the setup device is binding with the network device so that the network device allows the setup device to re-configure the network device; and
    re-configuring a corresponding function of the network device based on setting parameters received from the setup device;
    wherein, after the setup device receives the message for triggering the setting process, a software sequence operated in the setup device initiates a user interface to provide a menu for setting up the setting parameters relating to QoS parameters or access control parameters for the network device.

2. The method according to claim 1, wherein the setting parameters are stored in a memory of the network device, and that customized setting parameters with respect to the network device are generated after accumulating the setting parameters for a period of time.

3. The method according to claim 2, wherein the setup device is one of the terminal devices connected with the network device.

4. The method according to claim 1, wherein at least one of the QoS parameters is a bandwidth and/or priority setting corresponding to each of the terminal devices or applications; at least one of the access control parameters is a setting relating to a time limit for accessing the network and/or the applications used by each of the terminal devices.

5. The method according to claim 1, wherein the settings of QoS parameters and the access parameters are pre-configured by the setup device and performed in the network device for a period of time.

6. The method according to claim 1, wherein the settings of QoS parameters and the access parameters are restored to original settings after the period of time ends.

7. The according to claim 1, wherein the settings of QoS parameters and the access parameters are changed according to the calendar.

8. A system for setup of a network device, comprising:
    a network device in a LAN, connected with one or more terminal devices, including a processor and a memory, wherein the one or more terminal devices are connected to Internet via the network device, and the processor performs a method for setup of the network device comprising:
    analyzing packets received from at least one of the terminal devices;
    generating a message for triggering a setting process if a trigger condition is matched according to an analysis result, wherein the trigger condition is one or any combination of an application condition, a time condition and an identification for the one or more terminal devices that are set in the network device;
    transmitting the message for triggering a setting process from the network device to a setup device, wherein the setup device is connected with the network device via the LAN or an external network and the setup device is binding with the network device so that the network device allows the setup device to re-configure the network device;
    re-configuring a corresponding function of the network device based on setting parameters received from the setup device, wherein the setting parameters are related to QoS parameters or access control parameters for the network device; and
    the setup device initiating a setting interface to provide a menu for setting up the setting parameters when receiving the message for triggering a setting process;
    wherein the setting parameters are transmitted to the network device when the setting parameters are generated via the setting interface.

9. The system according to claim 8, further comprising a cloud server having a database and connecting with a plurality of network devices, wherein the cloud server is used to receive the setting parameters transmitted by the plurality of network devices, and then store the setting parameters in the database so as to generate a variety of customized setting parameters.

10. The system according to claim 8, wherein at least one of the QoS parameters is a bandwidth and/or priority setting corresponding to each of the terminal devices or applications; at least one of the access control parameters is a setting relating to a time limit for accessing the network and/or the applications used by each of the terminal devices.

11. The system according to claim 8, wherein the settings of QoS parameters and the access parameters are pre-configured by the setup device and performed by the network device for a period of time.

12. The system according to claim 11, wherein the settings of QoS parameters and the access parameters are restored to original settings after the period of time ends.

13. The system according to claim 8, further comprising a cloud server having a database and connecting with a plurality of network devices, wherein the cloud server is used to receive the setting parameters transmitted by the plurality of network devices, and then store the setting parameters in the database so as to generate a variety of customized setting parameters.

14. The system according to claim 13, wherein, the setting parameters transmitted by one of the plurality of network devices received by the database learn personal user setting parameters of individuals in each LAN.

15. The system according to claim 8, wherein the settings of QoS parameters and the access parameters are changed according to the calendar.

16. A system for setup of a network device, comprising:
a cloud server having a database and connecting with a plurality of network devices, wherein the cloud server is used to receive setting parameters transmitted by the plurality of network devices, and then store the setting parameters in the database so as to generate a variety of customized setting parameters;
wherein each of the plurality of network devices is in a LAN and is connected with one or more terminal devices wherein the one or more terminal devices are connected to Internet via the network device, and each of the plurality of network devices is configured to perform a method for setup of the network device comprising:

analyzing packets received from at least one of the terminal devices;

generating a message for triggering a setting process if a trigger condition is matched according to an analysis result, wherein the trigger condition is one or any combination of an application condition, a time condition and an identification for the one or more terminal devices that are set in the network device;

transmitting the message for triggering a setting process from the network device to a setup device, wherein the setup device is connected with the network device via the LAN or an external network and the setup device is binding with the network device so that the network device allows the setup device to re-configure the network device;

re-configuring a corresponding function of the network device based on setting parameters received from the setup device, wherein the setting parameters are related to QoS parameters or access control parameters for the network device; and the setup device initiating a setting interface to provide a menu for setting up the setting parameters when receiving the message for triggering a setting process;

wherein the setting parameters are transmitted to the network device when the setting parameters are generated via the setting interface; and a time characteristic of one of the plurality of network devices is learned from the setting parameters transmitted from the plurality of network devices through the database of the cloud server, so that the system automatically performs operations of the corresponding setting parameters on daily, weekly and monthly basis.

* * * * *